US009884288B2

(12) United States Patent
Takeda et al.

(10) Patent No.: US 9,884,288 B2
(45) Date of Patent: Feb. 6, 2018

(54) TREATMENT PROCESS OF GAS CONTAINING ZERO-VALENT MERCURY AND MERCURY SEPARATION SYSTEM

(71) Applicant: CHIYODA CORPORATION, Yokohama-shi, Kanagawa (JP)

(72) Inventors: Dai Takeda, Yokohama (JP); Eiji Awai, Yokohama (JP); Jun Matsumoto, Yokohama (JP); Masataka Uemura, Yokohama (JP); Hironobu Marukawa, Yokohama (JP)

(73) Assignee: CHIYODA CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/312,044

(22) PCT Filed: May 18, 2015

(86) PCT No.: PCT/JP2015/002473
§ 371 (c)(1),
(2) Date: Nov. 17, 2016

(87) PCT Pub. No.: WO2015/177999
PCT Pub. Date: Nov. 26, 2015

(65) Prior Publication Data
US 2017/0136408 A1 May 18, 2017

(30) Foreign Application Priority Data
May 21, 2014 (JP) ................................. 2014-104888

(51) Int. Cl.
*B01D 53/64* (2006.01)
*B01D 53/78* (2006.01)
(Continued)

(52) U.S. Cl.
CPC ............. *B01D 53/64* (2013.01); *B01D 53/78* (2013.01); *C01G 13/00* (2013.01); *B01D 2251/30* (2013.01); *B01D 2257/602* (2013.01)

(58) Field of Classification Search
CPC .... B01D 53/04; B01D 53/78; B01D 2251/30; B01D 2257/602; B01D 53/74; B01D 2258/0283; C01G 13/00; C01G 13/04
See application file for complete search history.

(56) References Cited

U.S. PATENT DOCUMENTS 3,849,537 A * 11/1974 Allgulin ................ B01D 53/64
423/210
5,294,417 A * 3/1994 Moore ................... C01G 13/00
210/753
(Continued)

FOREIGN PATENT DOCUMENTS

DE 197 54 065 A1 6/1999
EP 0 709 126 A1 5/1996
(Continued)

OTHER PUBLICATIONS

International Search Report dated Aug. 11, 2015, issued in counterpart International Application No. PCT/JP2015/002473 (2 pages).
(Continued)

*Primary Examiner* — Timothy C Vanoy
(74) *Attorney, Agent, or Firm* — Westerman, Hattori, Daniels & Adrian, LLP

(57) ABSTRACT

A treatment process of a gas containing zero-valent mercury and a mercury separation system, by which the amount of an iodine compound used can be reduced when the zero-valent mercury is separated from the gas containing the zero-valent mercury by using the iodine compound. The process has a step of oxidizing the zero-valent mercury contained in the gas with a first liquid phase containing an alkali metal (Continued)

iodide, thereby obtaining a second liquid phase containing a divalent mercury ion and an iodide ion; a step of separating the divalent mercury ion as mercury sulfide by adjusting the pH of the second liquid phase; and a step of circulating a third liquid phase which is obtained by separating the mercury sulfide in the mercury separation step to use the third liquid phase as the first liquid phase in the mercury oxidation step.

21 Claims, 4 Drawing Sheets

(51) Int. Cl.
*C01G 13/00* (2006.01)
*C01G 13/04* (2006.01)

(56) References Cited

U.S. PATENT DOCUMENTS

| | | | | |
|---|---|---|---|---|
| 8,883,099 | B2* | 11/2014 | Sjostrom | B01D 53/64 210/198.1 |
| 2002/0068030 | A1* | 6/2002 | Nolan | B01D 47/06 423/210 |
| 2005/0112044 | A1 | 5/2005 | Kuma et al. | |
| 2005/0147549 | A1 | 7/2005 | Lissianski et al. | |
| 2010/0025302 | A1 | 2/2010 | Sato et al. | |
| 2011/0014104 | A1 | 1/2011 | Ghorishi et al. | |
| 2011/0076210 | A1 | 3/2011 | Pollack et al. | |
| 2011/0262331 | A1 | 10/2011 | Ukai et al. | |
| 2013/0309157 | A1 | 11/2013 | Sjostrom et al. | |
| 2014/0331905 | A1* | 11/2014 | Sjostrom | B01D 46/00 110/345 |

FOREIGN PATENT DOCUMENTS

| | | |
|---|---|---|
| JP | 2003-313563 A | 11/2003 |
| JP | 2005-125211 A | 5/2005 |
| JP | 2005-230810 A | 9/2005 |
| JP | 2008-36554 A | 2/2008 |
| JP | 2008-212886 A | 9/2008 |
| JP | 2009-125659 A | 6/2009 |
| JP | 2009-226254 A | 10/2009 |
| JP | 2013-6143 A | 1/2013 |
| WO | 2008/072788 A1 | 6/2008 |

OTHER PUBLICATIONS

International Preliminary Report on Patentability (Form PCT/IB/373) issued in counterpart International Application No. PCT/JP2015/002473, with Form PCT/ISA/237. (9 pages), dated Nov. 2016.

Extended (supplementary) European Search Report dated Sep. 22, 2017, issued in counterpart European Application No. 15795643.4. (10 pages).

* cited by examiner

TREATMENT PROCESS OF GAS CONTAINING ZERO-VALENT MERCURY AND MERCURY SEPARATION SYSTEM

TECHNICAL FIELD

The present invention relates to a treatment process of a gas containing zero-valent mercury for separating the zero-valent mercury from the gas containing the zero-valent mercury such as a combustion exhaust gas and to a mercury separation system.

BACKGROUND ART

A sulfurous acid gas is generally contained in a combustion exhaust gas (hereinafter also referred to as "exhaust smoke") emitted from a boiler or the like of a thermal power plant, and in some cases, mercury may be contained at a high concentration according to the kind of fossil fuel (in particular, coal) burned. When they are emitted into the environment, they become harmful substances causing a health hazard, and so it is necessary to remove such harmful substances before the combustion exhaust gas is emitted in the air. Removal of such sulfurous acid gas has heretofore been required by the emission regulation, and an international effort on prevention of mercury pollution has been strengthened in addition to this regulation in recent years.

Methods for removing the sulfurous acid gas ($SO^2$) in the combustion exhaust gas include a wet method of removing it by being absorbed in an absorbing liquid and a dry method of removing it by being adsorbed on an adsorbent, and as for each of such methods various methods are known. When a large amount of a combustion exhaust gas containing a sulfurous acid gas at a high concentration is treated, however, the wet method which is advantageous in the treatment cost is generally adopted.

Mercury in the combustion exhaust gas includes divalent mercury ($Hg^{2+}$) present in the form of a divalent mercury compound by being oxidized by an oxidation catalyst or the like in a combustion furnace or an exhaust smoke denitrification apparatus and zero-valent mercury ($Hg^{(0)}$) present in the form of metal mercury of a simple substance (zero valence). $Hg^{2+}$ is almost removed by a wet method exhaust smoke desulfurization apparatus. However, the removal efficiency of the zero-valent mercury is low because its solubility in the absorbing liquid is small.

As a method for separating and removing the zero-valent mercury, there is a method of bringing exhaust smoke containing a sulfurous acid gas and mercury into contact with an absorbing liquid containing persulfuric acid and an iodine compound (see Patent Literature 1 or the like). In addition, there is also a method of adding an iodine gas into an exhaust gas containing a sulfurous acid gas and mercury and then bringing this mixture into contact with an absorbing liquid in a wet method exhaust smoke desulfurization apparatus, in which an iodine compound is used as an iodine gas generating source (see Patent Literature 2 or the like). In such methods of separating and removing the zero-valent mercury by using the iodine compound, a problem that the use amount of the iodine compound is large is caused, and so there is a demand for reducing the amount of the iodine compound used.

In addition, there is a method of bringing exhaust smoke containing zero-valent mercury, a sulfurous acid gas, oxygen and water into contact with a mercury adsorbent obtained by causing an iodine compound or the like to be carried on a surface of a carbon-based material and being subjected to a water-repellent treatment (see Patent Literature 3). Even in the technique of Patent Literature 3, it is considered that an absorbing liquid to which an iodine compound is added is used to separate and remove the zero-valent mercury. However, there is a demand for reducing the use amount of the iodine compound used even in this case.

Incidentally, there is the demand for reducing the use amount of the iodine compound upon the separation and removal of the zero-valent mercury not only in the treatment of the above-described combustion exhaust gas containing sulfurous acid and zero-valent mercury but also in other gasses containing zero-valent mercury.

CITATION LIST

Patent Literature

PTL 1: Japanese Patent Application Laid-Open No. 2008-212886
PTL 2: Japanese Patent Application Laid-Open No. 2009-125659
PTL 3: Japanese Patent Application Laid-Open No. 2009-226254

SUMMARY OF INVENTION

Technical Problem

In view of these problems, it is an object of the present invention to provide a treatment process of a gas containing zero-valent mercury and a mercury separation system, by which the use amount of an iodine compound can be reduced when the zero-valent mercury is separated from the gas containing the zero-valent mercury by using the iodine compound.

Solution to Problem

A treatment process of a gas containing zero-valent mercury according to the present invention which solves the above problems comprises a mercury oxidation step of oxidizing the zero-valent mercury contained in the gas containing the zero-valent mercury with a first liquid phase containing an alkali metal iodide to take the zero-valent mercury into the first liquid phase, thereby obtaining a second liquid phase containing a divalent mercury ion and an iodide ion, a mercury separation step of separating the divalent mercury ion as mercury sulfide by adjusting the pH of the second liquid phase obtained in the mercury oxidation step with a pH adjustor and adding an alkali metal sulfide, and a first circulation step of circulating a third liquid phase which is obtained by separating the mercury sulfide in the mercury separation step and contains an alkali metal ion and the iodide ion to use the third liquid phase as the first liquid phase in the mercury oxidation step.

The alkali metal of the alkali metal iodide used in the mercury oxidation step is favorably the same alkali metal as the alkali metal of the alkali metal sulfide used in the mercury separation step.

In the mercury oxidation step, the gas containing the zero-valent mercury is favorably brought into contact with the first liquid phase on a mercury adsorbing and oxidizing material composed of a carbon-based material.

The carbon-based material is favorably subjected to a water-repellent treatment.

The gas containing the zero-valent mercury may contain sulfur oxide.

In addition, the gas containing the zero-valent mercury may contain oxygen.

The mercury oxidation step favorably has a second circulation step of collecting the second liquid phase and circulating the collected second liquid phase to use the second liquid phase as the first liquid phase.

It is favorable that the alkali metal iodide is at least one selected from potassium iodide, lithium iodide and sodium iodide, and the iodine ion concentration in the first liquid phase is 0.01 to 10% by weight.

It is favorable that in the mercury separation step, the pH adjustor is at least one selected from lithium hydroxide, sodium hydroxide, potassium hydroxide, lithium hydrogencarbonate, sodium hydrogencarbonate, potassium hydrogencarbonate, lithium carbonate, sodium carbonate and potassium carbonate, and the pH of the second liquid phase is adjusted to 1.7 to 7.

It is favorable that in the mercury separation step, the alkali metal sulfide is at least one selected from lithium sulfide, sodium sulfide and potassium sulfide, and the amount of sulfur contained in the alkali metal sulfide is 0.6 to 1.2 times in terms of molar ratio with respect to the divalent mercury contained in the second liquid phase to which the alkali metal sulfide is added.

In the mercury separation step, the addition of the alkali metal sulfide is favorably controlled on the basis of the oxidation-reduction potential of the second liquid phase to which the alkali metal sulfide is added.

It may have an iodine gas recovery step of bringing an alkali metal hydroxide into contact with an iodine gas generated in the mercury oxidation step to absorb the iodine gas.

A solution in which the iodine gas obtained in the iodine gas recovery step is absorbed may be circulated to the mercury separation step.

A mercury separation system according to the present invention comprises a mercury oxidation unit into which a gas containing zero-valent mercury is introduced and which is configured to oxidize the zero-valent mercury with a first liquid phase containing an alkali metal iodide to take the zero-valent mercury into the first liquid phase, thereby obtaining a second liquid phase containing a divalent mercury ion and an iodide ion, a mercury separation unit configured to separate the divalent mercury ion as mercury sulfide by adjusting the pH of the second liquid phase discharged from the mercury oxidation unit a pH adjustor and adding an alkali metal sulfide, and a first circulation unit configured to circulate a third liquid phase which is obtained by separating the mercury sulfide in the mercury separation unit and contains an alkali metal ion and the iodide ion to use the third liquid phase as the first liquid phase in the mercury oxidation unit.

It is favorable that the mercury oxidation unit has a mercury oxidation portion configured to oxidize the zero-valent mercury with the first liquid phase to take it into the first liquid phase and a liquid tank portion which communicates with the mercury oxidation portion and is configured to store the second liquid phase, and also has a second circulation unit configured to circulate the second liquid phase stored in the liquid tank portion to the mercury oxidation portion to use the second liquid phase as the first liquid phase.

The iodine ion concentration in the liquid tank portion is favorably 0.01 to 10% by weight.

An alkali metal iodide addition unit configured to add an alkali metal iodide into the liquid tank portion may be included.

The mercury separation unit favorably has an oxidation-reduction potential measuring unit configured to measure the oxidation-reduction potential of the second liquid phase to which the alkali metal sulfide is added and an addition controlling unit configured to control the addition of the alkali metal sulfide on the basis of the oxidation-reduction potential measured by the oxidation-reduction potential measuring unit.

The system may have an iodine gas recovery unit configured to bring an alkali metal hydroxide into contact with an iodine gas generated in the mercury oxidation unit to absorb the iodine gas.

The system may have a third circulation unit configured to circulate a solution in which the iodine gas emitted from the iodine gas recovery unit is absorbed to the mercury sulfide separation unit.

A mercury separation system according to the present invention comprises a mercury oxidation device having a mercury oxidation portion filled with a mercury adsorbing and oxidizing material composed of a carbon-based material, a gas introduction unit configured to introduce a gas containing zero-valent mercury into the mercury oxidation portion to circulate it, an alkali metal iodide supplying unit configured to introduce a liquid containing an alkali metal iodide into the mercury oxidation portion to cause the liquid to flow down along a surface of the mercury adsorbing and oxidizing material and a liquid tank portion configured to store the liquid having flowed down; a mercury separation device having a pH adjusting unit configured to add a pH adjustor to the liquid taken out of the liquid tank portion, a mercury sulfide generation unit configured to add an alkali metal sulfide to the liquid taken out to generate mercury sulfide and a mercury sulfide separation unit configured to separate the mercury sulfide generated in the liquid whose pH is adjusted and to which the alkali metal sulfide is added; and a first circulation unit configured to circulate the liquid from which the mercury sulfide is separated and removed in the mercury sulfide separation unit of the mercury separation device to the mercury oxidation device.

Advantageous Effects of Invention

According to the present invention, zero-valent mercury is oxidized into divalent mercury with a liquid phase containing an alkali metal iodide, the resultant divalent mercury is caused to react with an alkali metal sulfide to immobilize mercury as mercury sulfide, and a liquid phase which is obtained together with this mercury sulfide and contains the alkali metal iodide is circulated to use the liquid phase again as a liquid phase for oxidizing the zero-valent mercury, whereby the amount of the alkali metal iodide used upon the separation and removal of the zero-valent mercury from a gas containing the zero-valent mercury can be greatly reduced.

DESCRIPTION OF EMBODIMENTS

Figure 1:
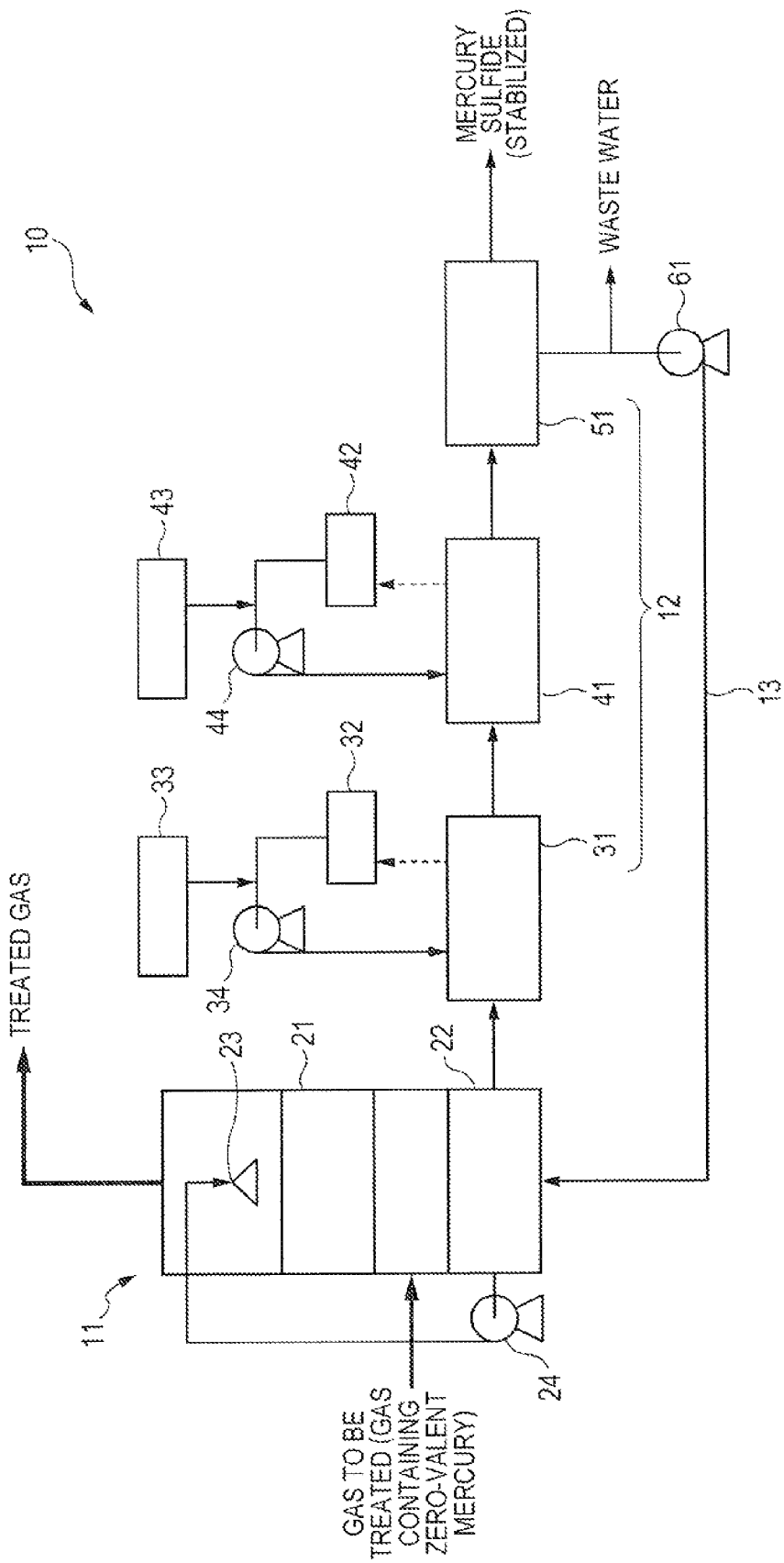
FIG. 1 is a schematic flow diagram illustrating an exemplary mercury separation system to which a treatment process of a gas containing zero-valent mercury according to the present invention can be applied.

A treatment process of a gas containing zero-valent mercury according to the present invention includes a mercury oxidation step of oxidizing the zero-valent mercury contained in the gas containing the zero-valent mercury with a first liquid phase containing an alkali metal iodide to take the zero-valent mercury into the first liquid phase, thereby obtaining a second liquid phase containing a divalent mercury ion and an iodide ion, a mercury separation step of separating the divalent mercury ion as mercury sulfide by adjusting the pH of the second liquid phase obtained in the mercury oxidation step with a pH adjustor and adding an alkali metal sulfide, and a first circulation step of circulating a third liquid phase which is obtained by separating the mercury sulfide in the mercury separation step and contains an alkali metal ion and the iodide ion to use the third liquid phase as the first liquid phase in the mercury oxidation step.

Specifically, the zero-valent mercury contained in the gas containing the zero-valent mercury is first oxidized with the first liquid phase containing the alkali metal iodide to take the zero-valent mercury into the first liquid phase, thereby obtaining the second liquid phase containing the divalent mercury ion and the iodide ion (mercury oxidation step).

The gas containing the zero-valent mercury which is a gas to be treated is not particularly limited so long as the gas contains the zero-valent mercury. However, as examples thereof, there are mentioned a gas containing a sulfur oxide (sulfurous acid gas or the like) and the zero-valent mercury such as a combustion exhaust gas, a gas obtained by subjecting this gas to a desulfurization treatment by an exhaust smoke desulfurization apparatus or the like and an exhaust gas which is generated by heating upon recovery of a metal from a battery or the like and contains the zero-valent mercury. In addition, the gas containing the zero-valent mercury favorably contains oxygen. Oxygen contained in the gas containing the zero-valent mercury functions as an oxidizing agent for oxidizing the zero-valent mercury in the mercury oxidation step. Incidentally, the gas containing the zero-valent mercury may also contain water. When the gas contains water, however, a mercury adsorbing and oxidizing material subjected to a water-repellent treatment is favorably used in the mercury oxidation step, which will be described in detail later.

As examples of the alkali metal iodide used for oxidizing the zero-valent mercury, there are mentioned potassium iodide, lithium iodide and sodium iodide. A solution obtained by dissolving such an alkali metal iodide in a solvent such as water, an alcohol or an ether is the first liquid phase. The iodine ion concentration in the first liquid phase is favorably 0.01 to 10% by weight. As the iodine ion concentration is higher, the mercury removal performance is higher. However, if the concentration exceeds 10% by weight, the mercury removal performance is not so improved.

No particular limitation is imposed on a method for obtaining the second liquid phase containing the divalent mercury ion and the iodide ion by oxidizing the zero-valent mercury contained in the gas containing the zero-valent mercury with the first liquid phase containing such an alkali metal iodide to take it into the first liquid phase. However, there is mentioned a method of bringing the first liquid phase containing the alkali metal iodide into contact with the gas containing the zero-valent mercury. When the alkali metal iodide is brought into contact with the zero-valent mercury, the zero-valent mercury ($Hg^{(0)}$) can be converted to divalent mercury ($Hg^{2+}$). For example, when potassium iodide is used as the alkali metal iodide, reactions of the following scheme (1) and scheme (2) are caused. As shown in the scheme (2), a liquid phase in such a form that $HgI_2$ is dissolved, that is, a liquid phase containing the divalent mercury ion and the iodide ion, is the second liquid phase.

Incidentally, the reactions of the following schemes are reactions caused in the presence of oxygen. If the gas containing the zero-valent mercury which is the gas to be treated does not contain oxygen or contains only a small amount of oxygen, it is only necessary to supply oxygen from the outside. Specifically, oxygen is supplied to the gas to be treated at, for example, a first stage of the mercury oxidation step.

Alternatively, oxygen may be supplied separately in the mercury oxidation step.

$$2I^- \rightarrow I_2 \qquad (1)$$

$$Hg^{(0)} + I_2 \rightarrow Hg^{2+} + 2I^- \qquad (2)$$

In the mercury oxidation step, the gas containing the zero-valent mercury is favorably brought into contact with the first liquid phase on the mercury adsorbing and oxidizing material composed of the carbon-based material. The zero-valent mercury and oxygen are caused to be adsorbed on the carbon-based material and brought into contact with the alkali metal iodide, whereby the zero-valent mercury can be successfully oxidized. As examples of the carbon-based material, there are mentioned active carbon, active carbon fiber, oven coke, and the like. As examples of a material of the active carbon, there are mentioned wood, coconut shell, coal, brown coal, peat, pitch, and the like. The BET specific surface area of the carbon-based material is favorably 2,500 $m^2/g$ or less and favorably 50 $m^2/g$ or more. The BET specific surface area is a specific surface area calculated from an adsorption amount of nitrogen gas by utilizing the BET adsorption isotherm. It is a value measured by the multipoint method using liquid nitrogen by means of, for example, a specific surface area measuring apparatus (product name "AUTOSORB-1", manufactured by Uasa Ionics Co., Ltd.). The form of the carbon-based material is favorably of particulates of those obtained by forming finely particulates or particulate material into grains, pellets, sheets, honeycombs or the like with a forming aid, because such a material has a large specific surface area and can make an adsorption amount of mercury or the like large. Among these, the honeycomb form is favorable because a pressure loss of the gas can be reduced. In addition, the carbon-based material is favorably that subjected to a water-repellent treatment. When the carbon-based material is that subjected to the water-repellent treatment, lowering of the mercury adsorption capacity of the carbon-based material caused by water can be prevented, so that the oxidation of the zero-valent mercury can be more successfully performed. As examples of the water-repellent treatment, there are mentioned a method of causing a water-repellent material such as a resin having a contact angle with water of 90° or more to be contained in the carbon-based material and a method of subjecting the carbon-based material to a heat treatment to remove a hydrophilic group on the surface of the carbon-based material. As examples of the resin having the contact angle with water of 90° or more, there may be mentioned fluororesins such as polytetrafluoroethylene, polychlorotrifluoroethylene and polytrifluoroethylene, polypropylene, polyethylene, and polystyrene.

A persulfate containing an alkali metal of the same kind as that of the alkali metal iodide may also be added together with the alkali metal iodide. As examples of the persulfate containing the alkali metal, there are mentioned sodium peroxodisulfate and potassium peroxodisulfate. Persulfuric acid may also oxidize the zero-valent mercury into divalent mercury. In addition, an iodide ion in a solution is oxidized to accelerate isolation of iodine (i.e. the reaction represented by the scheme (1)) which becomes an oxidizing agent for the zero-valent mercury. Incidentally, persulfuric acid becomes a sulfate ion after the reaction. The persulfate containing the alkali metal may be added to the first liquid phase for use.

In addition, as another method for obtaining the second liquid phase containing the divalent mercury ion and the iodide ion by oxidizing the zero-valent mercury contained in the gas containing the zero-valent mercury with the first liquid phase containing the alkali metal iodide to take it into the first liquid phase, there is mentioned a method of oxidizing the iodide ion contained in the first liquid phase by, for example, aerating the first liquid phase containing the alkali metal iodide with oxygen to generate an iodine gas and bringing the iodine gas generated into contact with the zero-valent mercury together with the first liquid phase.

It is favorable that the second liquid phase containing the divalent mercury ion and the iodide ion is collected in the mercury oxidation step, and the collected second liquid phase is circulated to use the second liquid phase as the first liquid phase to be used for the oxidation of the zero-valent mercury (second circulation step). Since all the alkali metal iodide contained in the first liquid phase used for oxidizing the zero-valent mercury is scarcely consumed for the oxidation of the zero-valent mercury, the first liquid phase containing the alkali metal iodide after being used for the oxidation of the zero-valent mercury is circulated within the mercury oxidation step to use the first liquid phase again for the oxidation of the zero-valent mercury, whereby the amount of the alkali metal iodide used can be reduced. Incidentally, in order to adjust the iodine ion amount in the first liquid phase used for the oxidation of the zero-valent mercury, the alkali metal iodide may also be continuously or intermittently added to a third liquid phase circulated in the first circulation step which will be described lately or in the second liquid phase circulated in the second circulation step.

The pH of the second liquid phase obtained in the mercury oxidation step is then adjusted with a pH adjustor, and moreover an alkali metal sulfide is added, thereby separating the divalent mercury ion as mercury sulfide (mercury separation step). The second liquid phase containing the divalent mercury ion and the iodide ion is subjected to the pH adjustment and allowed to react with the alkali metal sulfide, thereby generating mercury sulfide which precipitates without being dissolved. In other word, mercury can be immobilized. Incidentally, any step of the step of adjusting the pH of the second liquid phase obtained in the mercury oxidation step with the pH adjustor in the mercury separation step (pH adjusting step) and the step of adding the alkali metal sulfide may be conducted earlier. Alternatively, these steps may also be conducted at the same time.

Those heretofore used may be used as the pH adjustor. Among these, however, alkali metal hydroxides such as lithium hydroxide, sodium hydroxide, potassium hydroxide, lithium hydrogencarbonate, sodium hydrogencarbonate, potassium hydrogencarbonate, lithium carbonate, sodium carbonate and potassium carbonate are favorably used.

In addition, the pH of the second liquid phase is favorably adjusted to 1.7 to 7 because mercury sulfide is easily formed to increase the percentage of mercury recovery.

As examples of the alkali metal sulfide, there may be mentioned lithium sulfide, sodium sulfide and potassium sulfide. The alkali metal of this alkali metal sulfide is favorably the same alkali metal as the alkali metal of the alkali metal iodide used in the mercury oxidation step. For example, when potassium iodide is used as the alkali metal iodide in the mercury oxidation step, potassium sulfide is favorably used as the alkali metal sulfide. In the mercury separation step, a third liquid phase containing an alkali metal ion derived from the alkali metal sulfide and an iodide ion is obtained together with mercury sulfide which becomes a precipitate. In the present invention, this third liquid phase is circulated to reuse the third liquid phase as the first liquid phase in the mercury oxidation step. Therefore, when the alkali metal of the alkali metal sulfide used in the mercury separation step is the same as the alkali metal of the alkali metal iodide used in the mercury oxidation step, the third liquid phase obtained in the mercury separation step becomes a liquid phase in which the same alkali metal iodide as in the first liquid phase in the mercury oxidation step is dissolved. When the alkali metal iodide circulated to the mercury oxidation step in the first circulation step is the same as the alkali metal iodide used in the mercury oxidation step as described above, favorable conditions of the mercury oxidation reaction or the like caused in the mercury oxidation step do not easily change, and so the treatment of the gas is easily controlled. In addition, the same alkali metal is used as described above, whereby a purification treatment to be done as needed when the third liquid phase obtained in the mercury separation step is discharged outside the system as well as recovery of the alkali metal are easily performed. Incidentally, when an alkali metal hydroxide is used as the pH adjustor, the alkali metal of this alkali metal hydroxide is favorably the same alkali metal as the alkali metal of the alkali metal iodide used in the mercury oxidation step for the same reason.

No particular limitation is imposed on the amount of the alkali metal sulfide added to the second liquid phase. However, the amount of sulfur contained in the alkali metal sulfide is 0.6 to 1.2 times in terms of molar ratio with respect to the divalent mercury contained in the second liquid phase to which the alkali metal sulfide is added from the viewpoints of an effective usage amount of sulfur (S) contained in the alkali metal sulfide and the mercury absorption rate.

In addition, it is favorable to control addition conditions of the alkali metal sulfide, such as the addition rate and the addition amount in the mercury separation step on the basis of the oxidation-reduction potential of the second liquid phase to which the alkali metal sulfide is added.

The mercury sulfide formed as the precipitate is separated and recovered from the liquid phase. No particular limitation is imposed on a method for separating the mercury sulfide. As an example thereof, there is mentioned solid-liquid separation such as still-standing. The mercury sulfide subjected to the solid-liquid separation may be recovered by conducting filtration or the like as needed.

The third liquid phase containing the alkali metal ion and the iodide ion which is residue obtained by separating the mercury sulfide in the mercury separation step is circulated to use the third liquid phase as the first liquid phase in the mercury oxidation step (first circulation step). The whole of the third liquid phase obtained in the mercury separation step may be circulated to the mercury oxidation step. However, a part thereof may also be subjected to a purification treatment as needed and then discharged as waste water outside the system.

In this manner, the zero-valent mercury is oxidized into divalent mercury with the liquid phase containing the alkali metal iodide, the resultant divalent mercury is caused to react with the alkali metal sulfide to immobilize mercury as mercury sulfide, and the obtained together with this mercury sulfide is circulated to use the alkali metal iodide again as a liquid phase for oxidizing the zero-valent mercury, whereby the amount of the alkali metal iodide used can be greatly suppressed.

In addition, for example, when the amount of the alkali metal iodide used for the oxidation of the zero-valent mercury is larger than the amount of the zero-valent mercury, an iodine gas may be generated in the mercury oxidation step in some cases. In such a case, an alkali metal hydroxide may be brought into contact with the iodine gas generated to absorb the iodine gas (iodine gas recovery step). A solution in which the iodine gas obtained in this iodine gas recovery step is absorbed may also be circulated to the mercury separation step. The solution in which the iodine gas is absorbed is circulated to the mercury separation step to go through the mercury separation step or the first circulation step, whereby the iodine gas generated in the mercury oxidation step can be used as an alkali metal iodide in the mercury oxidation step.

No particular limitation is imposed on the alkali metal hydroxide used in the iodine gas recovery step so long as it can absorb the iodine gas. As examples thereof, there may be mentioned the same alkali metal hydroxides as those used in the pH adjusting step, such as lithium hydroxide, sodium hydroxide and potassium hydroxide.

An exemplary mercury separation system which can conduct such a treatment process for a gas containing zero-valent mercury according to the present invention will be described with reference to FIG. 1. FIG. 1 is a schematic flow diagram illustrating an exemplary mercury separation system to which the treatment process of the gas containing the zero-valent mercury according to the present invention can be applied.

As illustrated in FIG. 1, a mercury separation system 10 according to the present invention has a mercury oxidation unit (mercury adsorbing and oxidizing tower) 11 into which a gas containing zero-valent mercury is introduced and in which the zero-valent mercury is oxidized with a first liquid phase containing an alkali metal iodide to take the zero-valent mercury into the first liquid phase, thereby obtaining a second liquid phase containing a divalent mercury ion and an iodide ion; a mercury separation unit 12 in which the pH of the second liquid phase discharged from the mercury oxidation unit 11 is adjusted with a pH adjustor and the divalent mercury ion is separated as mercury sulfide by adding an alkali metal sulfide; and a first circulation unit 13 which circulates a third liquid phase which is obtained by separating the mercury sulfide in the mercury separation unit 12 and contains an alkali metal ion and the iodide ion to use the third liquid phase as the first liquid phase in the mercury oxidation unit 11.

The mercury oxidation unit 11 has a mercury oxidation portion 21 into which the gas containing the zero-valent mercury is introduced and in which the zero-valent mercury is oxidized with the first liquid phase to take it into the first liquid phase, and a liquid tank portion 22 which communicates with the mercury separation portion 21 and stores the second liquid phase. This liquid tank portion 22 is provided at a lower part of the mercury oxidation portion 21, a gas inlet port for introducing the gas containing the zero-valent mercury into the mercury oxidation unit 11 is provided between the mercury oxidation portion 21 and the liquid tank portion 22, and a gas outlet for emitting a treated gas is provided at the top of the mercury oxidation unit 11. In addition, a mercury adsorbing and oxidizing material composed of a carbon-based material is filled in the mercury oxidation portion 21. By such a construction, the gas containing the zero-valent mercury introduced into the mercury oxidation unit 11 is circulated as an upflow through the mercury oxidation portion 21 filled with the mercury adsorbing and oxidizing material. "Gas introduction unit" as set forth in the claims is constructed by the mercury oxidation portion 21 filled with the mercury adsorbing and oxidizing material, the liquid tank portion 22 provided at the lower part of the mercury oxidation portion 21, the gas inlet port provided between the mercury oxidation portion 21 and the liquid tank portion 22 and the gas outlet provided at the top of the mercury oxidation unit 11. It has a second circulation unit which circulates the second liquid phase stored in the liquid tank portion 22 to the mercury oxidation portion 21 and is composed of a pump 24 or the like. In addition, a sprayer 23 (alkali metal iodide supply unit) which sprays the first liquid phase on the mercury adsorbing and oxidizing material filled in the mercury oxidation portion 21 is provided in the mercury oxidation unit 11, and so the mercury oxidation unit 11 is so constructed that the gas containing the zero-valent mercury and the first liquid phase come into contact with each other on the mercury adsorbing and oxidizing material in the mercury oxidation portion 21 and fall down as the second liquid phase to be stored in the liquid tank portion 22. In addition, an alkali metal iodide addition unit (not illustrated) which continuously or intermittently adds an alkali metal iodide into the liquid tank portion 22 is provided in the mercury oxidation unit 11.

The mercury separation unit 12 has a pH adjusting unit 31 which adjusts the pH of the second liquid phase discharged from the mercury oxidation unit 11 with a pH adjustor, a mercury sulfide generation unit 41 which adds an alkali metal sulfide to the second liquid phase discharged from the pH adjusting unit 31 to generate mercury sulfide, and a mercury sulfide separation unit 51 which separates the mercury sulfide discharged from the mercury sulfide generation unit 41.

The pH adjusting unit 31 has a pH meter 32 which measures the pH of the second liquid phase to which the pH adjustor is supplied and a pump 34 for supplying an alkali metal hydroxide from an alkali metal hydroxide storage container 33 in which the alkali metal hydroxide, which is the pH adjustor, is stored to the second liquid phase in the pH adjusting unit 31.

The mercury sulfide generation unit 41 has an oxidation-reduction potential measuring unit 42 which measures the oxidation-reduction potential (ORD) of the second liquid phase to which the alkali metal sulfide is added, a pump 44 for supplying the alkali metal sulfide from an alkali metal sulfide storage container 43 in which the alkali metal sulfide is stored to the second liquid phase in the mercury sulfide generation unit 41, and an addition controlling unit (not illustrated) which controls the addition of the alkali metal sulfide on the basis of the oxidation-reduction potential measured by the oxidation-reduction potential measuring unit 42.

The mercury sulfide separation unit 51 is composed of a solid-liquid separation unit which leaves a liquid phase which is discharged from the mercury sulfide generation unit 41 and contains the mercury sulfide at rest to separate it into the mercury sulfide (precipitate) and a third liquid phase (supernatant).

The first circulation unit 13 has a pump 61 for circulating the third liquid phase, which is the supernatant in the mercury sulfide separation unit 51, to introduce it into the liquid tank portion 22 of the mercury oxidation unit 11.

Embodiments of the treatment of a gas containing zero-valent mercury using such a mercury separation system 10 will hereinafter be described. A gas containing zero-valent mercury and oxygen as a gas to be treated is first introduced from the gas inlet port provided at a lower part of the mercury oxidation portion 21, whereby the gas containing the zero-valent mercury is caused to flow up and is circulated as an upflow through the mercury adsorbing and oxidizing material filled in the mercury oxidation portion 21, and so the zero-valent mercury and oxygen are adsorbed on the mercury adsorbing and oxidizing material. On the other hand, the first liquid phase containing the alkali metal iodide is continuously or intermittently sprayed on the mercury adsorbing and oxidizing material filled in the mercury oxidation portion 21 from the sprayer 23. The reactions of the scheme (1) and the scheme (2) are thereby caused on the mercury adsorbing and oxidizing material. Accordingly, the zero-valent mercury contained in the gas to be treated is oxidized into divalent mercury with the alkali metal iodide. The zero-valent mercury becomes divalent mercury which is an ion, thereby being taken into the first liquid phase, and so the second liquid phase containing divalent mercury and an iodide ion is obtained. The resultant second liquid phase is caused to flow down along a surface of the mercury adsorbing and oxidizing material and stored in the liquid tank portion 22. Incidentally, since this oxidation reaction of the zero-valent mercury requires oxygen, oxygen is supplied to a front part of the mercury oxidation portion 21 or to the mercury oxidation portion 21, if the gas to be treated does not contain oxygen or contains only a small amount of oxygen. In other words, oxygen is supplied to the gas to be treated before or when introduced into the mercury oxidation portion 21. The treated gas from which the zero-valent mercury has been removed in this manner is emitted from the gas outlet provided at the top of the mercury oxidation unit 11.

Since the alkali metal iodide is also dissolved in the second liquid phase stored in the liquid tank portion 22, a part of the second liquid phase stored in the liquid tank portion 22 is circulated to the sprayer 23 through the second circulation unit having the pump 24 and sprayed again on the mercury adsorbing and oxidizing material to be used for the oxidation of the zero-valent mercury. In addition, a part of the second liquid phase stored in the liquid tank portion 22 is continuously or intermittently discharged from the liquid tank portion 22 and supplied to the pH adjusting unit 31. In other words, a part of the second liquid phase stored in the liquid tank portion 22 is continuously or intermittently taken out of the liquid tank portion 22 and transferred to the pH adjusting unit 31.

The second liquid phase supplied to the pH adjusting unit 31 is adjusted to a desired pH with an alkali metal hydroxide (pH adjustor) supplied from the alkali metal hydroxide storage container 33 by means of the pump 34 or the like. The pH of the second liquid phase in the pH adjusting unit 31 is favorably adjusted to 1.7 to 7. The second liquid phase subjected to the pH adjustment in the pH adjusting unit 31 is discharged and supplied to the mercury sulfide generation unit 41.

An alkali metal sulfide is added into the second liquid phase supplied to the mercury sulfide generation unit 41 from the alkali metal sulfide storage container 43 by means of the pump 44 or the like, and the divalent mercury contained in the second liquid phase is converted to mercury sulfide. The addition conditions of the alkali metal sulfide, such as the addition rate and the addition amount are favorably controlled by measuring the oxidation-reduction potential of the second liquid phase in the mercury sulfide generation unit 41 by the oxidation-reduction potential measuring unit 42 so as to easily generate the mercury sulfide on the basis of the measured oxidation-reduction potential.

A liquid phase which is discharged from the mercury sulfide generation unit 41 and contains the mercury sulfide is supplied to the mercury sulfide separation unit 51 and subjected to solid-liquid separation or the like, and so the mercury sulfide is recovered. In addition, the third liquid phase which is a supernatant is introduced into the liquid tank portion 22 of the mercury oxidation unit 11 through the first circulation unit 13 having the pump 61.

An alkali metal iodide is dissolved in the third liquid phase introduced into the liquid tank portion 22 through the first circulation unit 13, and the third liquid phase is circulated to the sprayer 23 through the second circulation unit and used again as the first liquid phase sprayed on the mercury adsorbing and oxidizing material. In FIG. 1, the third liquid phase has been circulated to the liquid tank portion 22. However, the third liquid phase may not go through the liquid tank portion 22 so long as it is circulated in order to enable the third liquid phase to be used as the first liquid phase for oxidizing the zero-valent mercury in the mercury oxidation unit 11. For example, the third liquid phase may also be introduced directly into the sprayer 23.

The mercury separation system according to the present invention is used in this manner, whereby the amount of the alkali metal sulfide used can be greatly reduced.

In the above, the gas containing the zero-valent mercury introduced into the mercury oxidation unit 11 has been circulated as an upflow through the mercury oxidation portion 21 filled with the mercury adsorbing and oxidizing material. However, the gas containing the zero-valent mercury may be circulated not only as the upflow but also as a downflow through the mercury oxidation portion 21. For example, the gas containing the zero-valent mercury may also be circulated as a downflow through the mercury oxidation portion 21 with such a construction that the gas inlet port is provided at an upper part of the mercury oxidation portion 21, and the gas outlet is provided at a lower part of the mercury oxidation portion 21, in FIG. 1.

Figure 2:
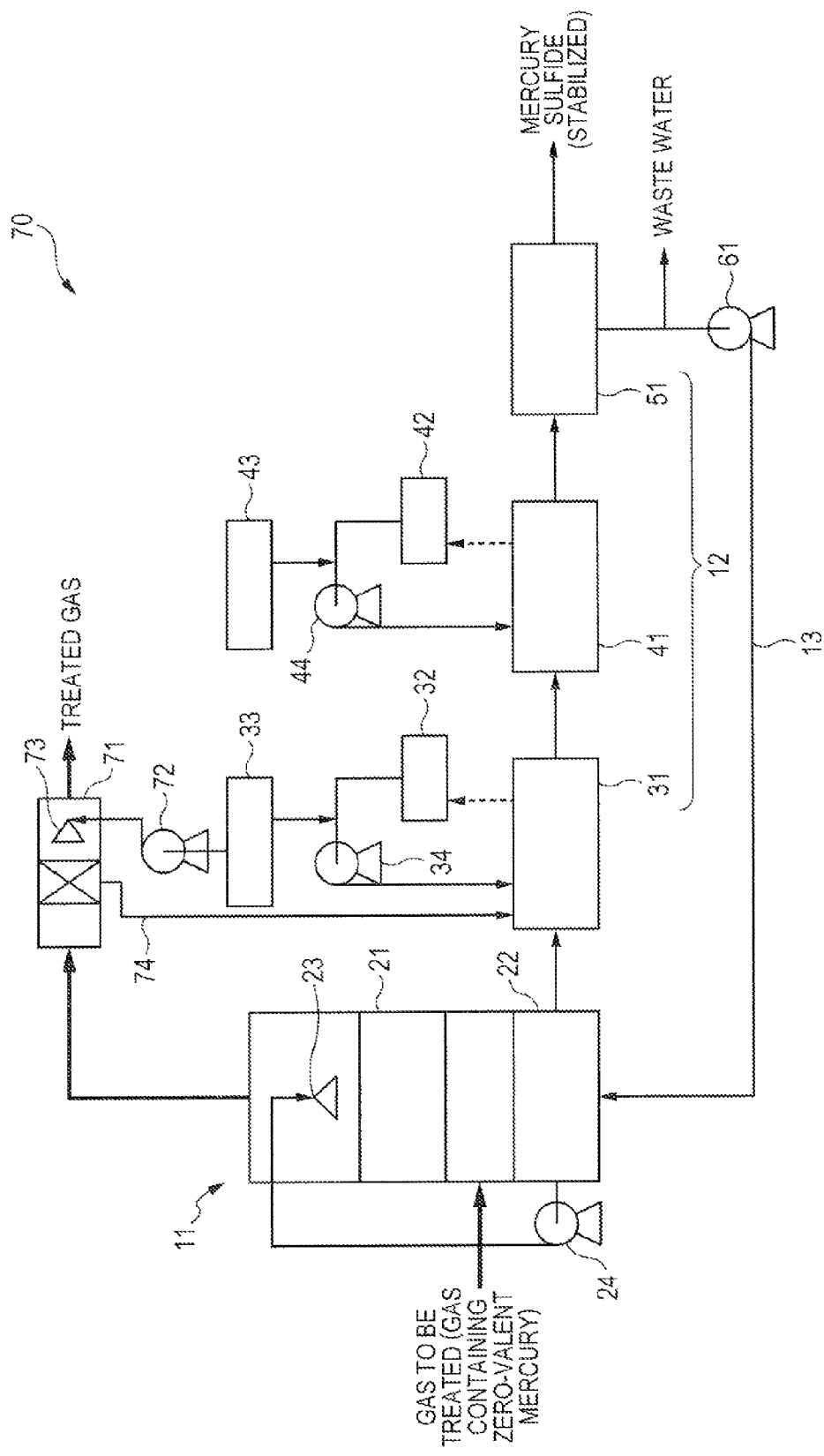
FIG. 2 is a schematic flow diagram illustrating another exemplary mercury separation system to which a treatment process of a gas containing zero-valent mercury according to the present invention can be applied.

In addition, the mercury separation system according to the present invention may have an iodine gas recovery unit 71 which brings an alkali metal hydroxide into contact with the iodine gas generated in the mercury oxidation unit 11 to absorb the iodine gas. The mercury separation system having the iodine gas recovery unit will be described with reference to FIG. 2. FIG. 2 illustrates the mercury separation system 70 having the iodine gas recovery unit 71, and the same signs are attached to the same members as in FIG. 1 to omit redundant descriptions. As illustrated in FIG. 2, the mercury separation system 70 is a system provided with the iodine gas recovery unit 71 and a third circulation unit 74 which circulates a solution in which the iodine gas emitted from the iodine gas recovery unit is absorbed to the mercury separation unit 12 in the mercury separation system 10 illustrated in FIG. 1.

Specifically, the mercury separation system 70 has the iodine gas recovery unit 71 into which the treated gas emitted from the top of the mercury oxidation unit 11 is introduced and which is provided with a sprayer 73 which sprays an alkali metal hydroxide on the introduced treated gas from the alkali metal hydroxide storage container 33 through a pump 72. In addition, the mercury separation system 70 has the third circulation unit 74 which circulates a solution in which the iodine gas emitted from the iodine gas recovery unit 71 is absorbed to the pH adjusting unit 31.

In such a mercury separation system 70, the treated gas emitted from the top of the mercury oxidation unit 11 is introduced into the iodine gas recovery unit 71, and the alkali metal hydroxide is sprayed on the introduced treated gas from the sprayer 73, whereby the iodine gas contained in the introduced treated gas is absorbed in the alkali metal hydroxide (iodine gas absorbing liquid). Accordingly, the treated gas emitted from the iodine gas recovery unit 71 is a gas having a reduced iodine gas content.

On the other hand, the solution in which the iodine gas emitted from the iodine gas recovery unit 71 is absorbed is circulated to the pH adjusting unit 31 through the third circulation unit 74. By being circulated to the pH adjusting unit 31, the solution is circulated again to the liquid tank portion 22 through the mercury separation unit 12 and the first circulation unit 13 and can be used as the first liquid phase.

In FIGS. 1 and 2, embodiments of the treatment of the gas containing the zero-valent mercury have been described. However, a gas further containing a sulfurous acid gas in addition to the zero-valent mercury or the like may also be treated. When the gas also containing the sulfurous acid gas is taken as a gas to be treated, the sulfurous acid gas is oxidized into sulfuric acid on the mercury oxidizing and adsorbing material composed of the carbon-based material filled in the mercury oxidation unit 11 and taken in the second liquid phase, so that a treated gas in which the sulfurous acid gas has also been separated and removed from the gas to be treated can be obtained.

In addition, the gas containing the zero-valent mercury and sulfurous acid gas is treated by a wet method exhaust smoke desulfurization apparatus in which what is called a lime-gypsum method is conducted to remove the sulfurous acid gas, and a gas emitted from this exhaust smoke desulfurization apparatus may be taken as a gas to be treated in the above-described mercury separation systems according to the present invention. In other words, the mercury separation system according to the present invention may be provided subsequently to the exhaust smoke desulfurization apparatus.

In addition, the third liquid phase or the like having gone through the first circulation unit 13 is aerated with oxygen, thereby oxidizing the iodide ion contained in the third liquid phase into an iodine gas, and the third liquid phase containing this iodine gas may also be used as the first liquid phase to oxidize the zero-valent mercury into the divalent mercury with the iodine gas.

EXAMPLES

The present invention will hereinafter be described by Examples for more understanding the invention. However, Examples have nothing to limit the present invention.

Comparative Example 1

The mercury separation system 10 illustrated in FIG. 1 which is so constructed that the third liquid phase which is a supernatant in the mercury sulfide separation unit 51 is circulated to the liquid tank portion 22 of the mercury oxidation unit 11 through the first circulation unit 13 was used to treat a gas containing zero-valent mercury, the treated gas was emitted from a gas outlet of the mercury oxidation unit 11, and solid mercury sulfide was recovered from the mercury sulfide separation unit 51. A model exhaust gas of a gas temperature of 50° C., a gas flow rate of 500 NL/h, an oxygen concentration of 5% by volume, a zero-valent mercury concentration of 50 µg/Nm$^3$ and a water content of 12% by volume, the remainder of said gas being adjusted with $N_2$ gas, was used as a gas to be treated. In addition, 0.01 L of an adsorbent obtained by mixing active carbon and a forming aid (polyethylene resin) and being formed into a honeycomb form was filled as a mercury adsorbing and oxidizing material in the mercury oxidation portion 21, and water was continuously sprayed on the mercury adsorbing and oxidizing material from the sprayer 23 at a proportion of 0.5 (L/Nm$^3$) in terms of liquid/gas ratio (ratio of the liquid to be sprayed from the sprayer 23 to the gas to be treated) in order for the gas to be treated to come into contact with the liquid sprayed on the mercury adsorbing and oxidizing material from the sprayer 23. Incidentally, the BET specific surface area of the used active carbon as measured by the multipoint method using liquid nitrogen by means of a specific surface area measuring apparatus (product name "AUTOSORB-1", manufactured by Uasa Ionics Co., Ltd.) was 780 m$^2$/g. In addition, sodium hydroxide was used as a pH adjustor to adjust the pH of a second liquid phase in the pH adjusting unit 31 so as to give a pH of 7. In addition, potassium sulfide was used as an alkali metal sulfide.

Figure 3:
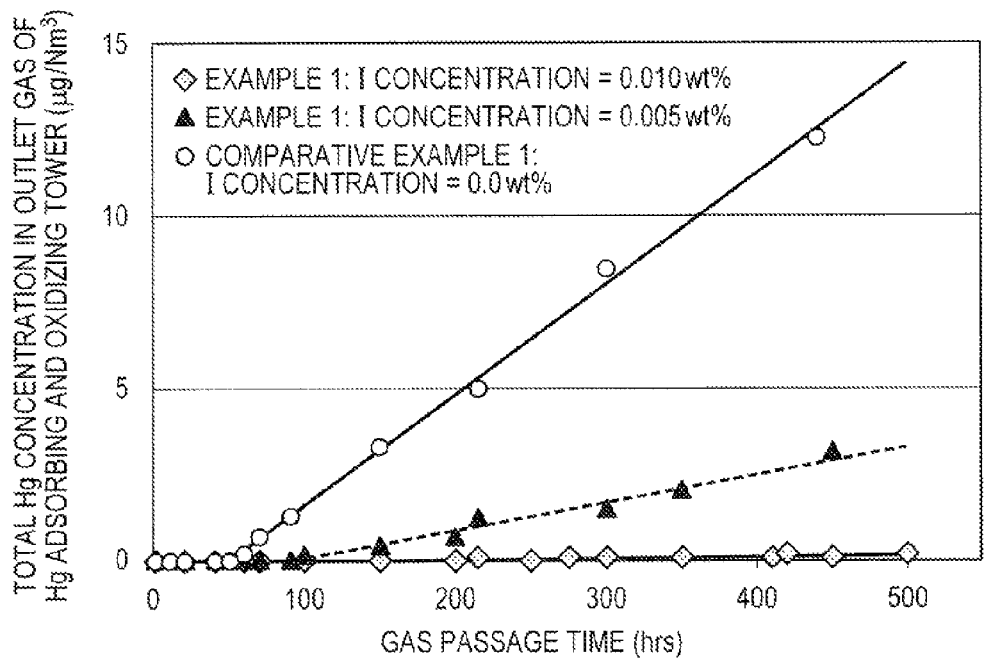
FIG. 3 illustrates results of Example 1 and Comparative Example 1.

The total Hg concentration in the treated gas emitted from the gas outlet of the mercury oxidation unit 11 was measured, and results obtained by determining the transition of the total Hg concentration (referred to as "total Hg concentration in outlet gas of Hg adsorbing and oxidizing tower" in FIG. 3) to the gas passage time of the gas to be treated (referred to as "gas passage time" in FIG. 3) are illustrated in FIG. 3. Incidentally, a morphological continuous mercury measuring apparatus based on the principle of the reduced vaporized ultraviolet absorption spectroscopy was used as a measuring apparatus.

Example 1

The same operation as in Comparative Example 1 was conducted except that water containing sodium iodide was sprayed in place of water on the mercury adsorbing and oxidizing material from the sprayer 23. The operation was carried out under two conditions 0.005% and 0.01% NaI concentrations by weight in terms of iodine ion concentration (referred to as "I concentration" in FIG. 3). Results are illustrated in FIG. 3.

Since the mercury separation system according to the present invention which is so constructed that the third liquid phase which is a supernatant in the mercury sulfide separation unit 51 is circulated to the liquid tank portion 22 of the mercury oxidation unit 11 through the first circulation unit 13 was used in Example 1, the amount of the alkali metal iodide (sodium iodide) used for oxidizing the zero-valent mercury was small. In addition, since the alkali metal iodide was used in Example 1, it was also confirmed that the zero-valent mercury can be favorably removed compared with Comparative Example 1 as illustrated in FIG. 3. With the rise of the iodine ion concentration, the total Hg concentration is suppressed over a long period of time, and it was also found that a high Hg removal rate can be retained over a long period of time (500 hours or more).

Comparative Example 2

The mercury separation system 10 illustrated in FIG. 1 which is so constructed that the third liquid phase which is a supernatant in the mercury sulfide separation unit 51 is circulated to the liquid tank portion 22 of the mercury oxidation unit 11 through the first circulation unit 13 was used to treat a gas containing zero-valent mercury, a treated gas was emitted from the gas outlet of the mercury oxidation unit 11, and solid mercury sulfide was recovered from the mercury sulfide separation unit 51. A model exhaust gas of a gas temperature of 50° C., a gas flow rate of 200 NL/h, an oxygen concentration of 5% by volume, a zero-valent mercury concentration of 3,000 μg/Nm³, an $SO_2$ concentration of 3,000 ppm and a water content of 12% by volume, the remainder of said gas being adjusted with $N_2$ gas, was used as a gas to be treated. In addition, 0.5 L of an adsorbent obtained by mixing active carbon, a forming aid (polyethylene resin) and a water-repellent treatment agent (polytetrafluoroethylene resin) and being formed into a honeycomb form was filled as a mercury adsorbing and oxidizing material in the mercury oxidation portion 21, and water was continuously sprayed on the mercury adsorbing and oxidizing material from the sprayer 23 at a proportion of 0.5 (L/Nm³) in terms of liquid/gas ratio (ratio of the liquid to be sprayed from the sprayer 23 to the gas to be treated) in order for the gas to be treated to come into contact with the liquid sprayed on the mercury adsorbing and oxidizing material from the sprayer 23. Incidentally, the BET specific surface area of the used active carbon as measured by the multipoint method using liquid nitrogen by means of a specific surface area measuring apparatus (product name "AUTOSORB-1", manufactured by Uasa Ionics Co., Ltd.) was 780 m²/g. In addition, potassium hydroxide was used as a pH adjustor to adjust the pH of a second liquid phase in the pH adjusting unit 31 so as to give a pH of 3. In addition, potassium sulfide was used as an alkali metal sulfide.

The total Hg concentration in the treated gas emitted from the gas outlet of the mercury oxidation unit 11 was measured to determine the time required until this Hg concentration reaches 100 μg/Nm³ (referred to as "Time required until Hg concentration in outlet gas reaches 100 μg/Nm³" in Table 1). In addition, the concentration of an iodine gas in the treated gas emitted from the gas outlet of the mercury oxidation unit 11 when reached 100 μg/Nm³ (referred to as "$I_2$ concentration in outlet gas" in Table 1) was also measured. Results are shown in Table 1. Incidentally, a morphological continuous mercury measuring apparatus based on the principle of the reduced vaporized ultraviolet absorption spectroscopy was used as a measuring apparatus.

Example 2

The same operation as in Comparative Example 2 was conducted except that water containing potassium iodide was sprayed in place of water from the sprayer 23 on the mercury adsorbing and oxidizing material. The operation was carried out under conditions of 30% KI concentration by weight or less in terms of iodine ion concentration (referred to as "I concentration" in Table 1). Results are shown in Table 1.

TABLE 1

|  | Comp. Ex. 2 | Example 2 | | | | | | | |
|---|---|---|---|---|---|---|---|---|---|
| I concentration (% by weight) | 0 | 0.5 | 1 | 5 | 10 | 15 | 20 | 25 | 30 |
| Time required until Hg concentration in outlet gas reaches 100 μg/Nm³ | 30 hr. | 350 hr. | 500 hr. or more | 500 hr. or more | 500 hr. or more | 500 hr. or more | 500 hr. or more | 500 hr. or more | 500 hr. or more |
| $I_2$ concentration in outlet gas | X | X | X | X | X | Δ | ▲ | ○ | ⊚ |

$I_2$ concentration in outlet gas,
X: not detected,
Δ: 5 ppm or less,
▲: exceeding 5 ppm and 15 ppm or less,
○: exceeding 15 ppm and 30 ppm or less,
⊚: exceeding 30 ppm.

Since the mercury separation system according to the present invention which is so constructed that the third liquid phase which is a supernatant in the mercury sulfide separation unit 51 is circulated to the liquid tank portion 22 of the mercury oxidation unit 11 through the first circulation unit 13 in the same manner as in Example 1 was used in Example 2, the amount of the alkali metal iodide (potassium iodide) used for oxidizing the zero-valent mercury was small. In addition, it was confirmed that the time during which the Hg concentration in the treated gas emitted from the gas outlet of the mercury oxidation unit 11 is suppressed is retained by increasing the iodine ion concentration, while an iodine gas is generated when the iodine ion concentration is 15% by weight or more, and so the loss of the alkali metal iodide occurs. Accordingly, the concentration of the alkali metal iodide in the first liquid phase sprayed from the sprayer 23 is favorably less than 15% by weight, more favorably about 10% by weight or less from the viewpoint of optimizing the amount of the alkali metal iodide used.

Example 3

Figure 4:
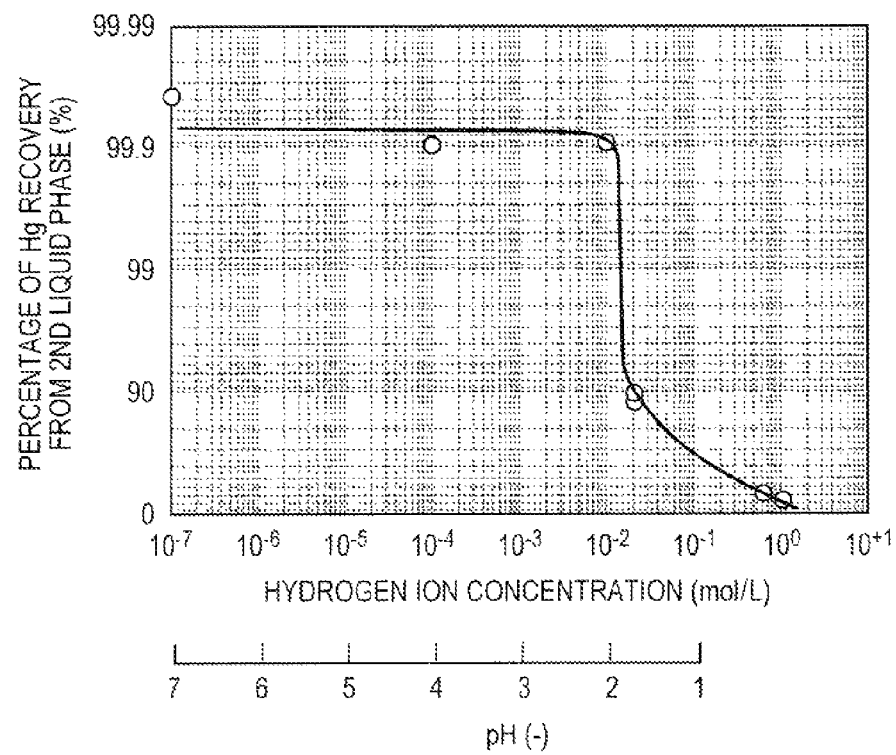
FIG. 4 illustrates results of Example 3.

A gas containing zero-valent mercury was treated under the same conditions as in Example 2 except that the iodine ion concentration was set to 1% by weight in Example 2, the pH (hydrogen ion concentration) of the second liquid phase was changed in the pH adjusting unit 31, and the molar ratio (S/Hg ratio) of the amount of S in the potassium sulfide added at the mercury sulfide generation unit 41 to the amount of Hg contained in the mercury sulfide recovered from the mercury sulfide separation unit 51 was controlled to 1.0, the treated gas was emitted from the mercury oxidation unit 11, and solid mercury sulfide was recovered from the mercury sulfide separation unit 51. Results obtained by determining the relation between the hydrogen ion concentration of the second liquid phase in the pH adjusting unit 31 and the percentage of Hg recovery from the second liquid phase are illustrated in FIG. 4. Incidentally, the percentage (%) of Hg recovery was determined by multiplying by 100 a value obtained by dividing the weight of mercury contained in the mercury sulfide recovered at the mercury sulfide separation unit 51 per unit time by the weight of Hg entering the mercury sulfide generation unit 41 per unit time likewise.

As illustrated in FIG. 4, a percentage of Hg recovery of about 90% was achieved at a hydrogen ion concentration of $2\times10^{-2}$ mol/L (pH=1.7) or less, and the percentage of Hg recovery was 99.9% or more at $1\times10^{-2}$ mol/L (pH=2). Thereafter, the percentage of Hg recovery showed 99.9% or more up to a hydrogen ion concentration of $1\times10^{-7}$ mol/L (pH=7).

Example 4

Figure 5:
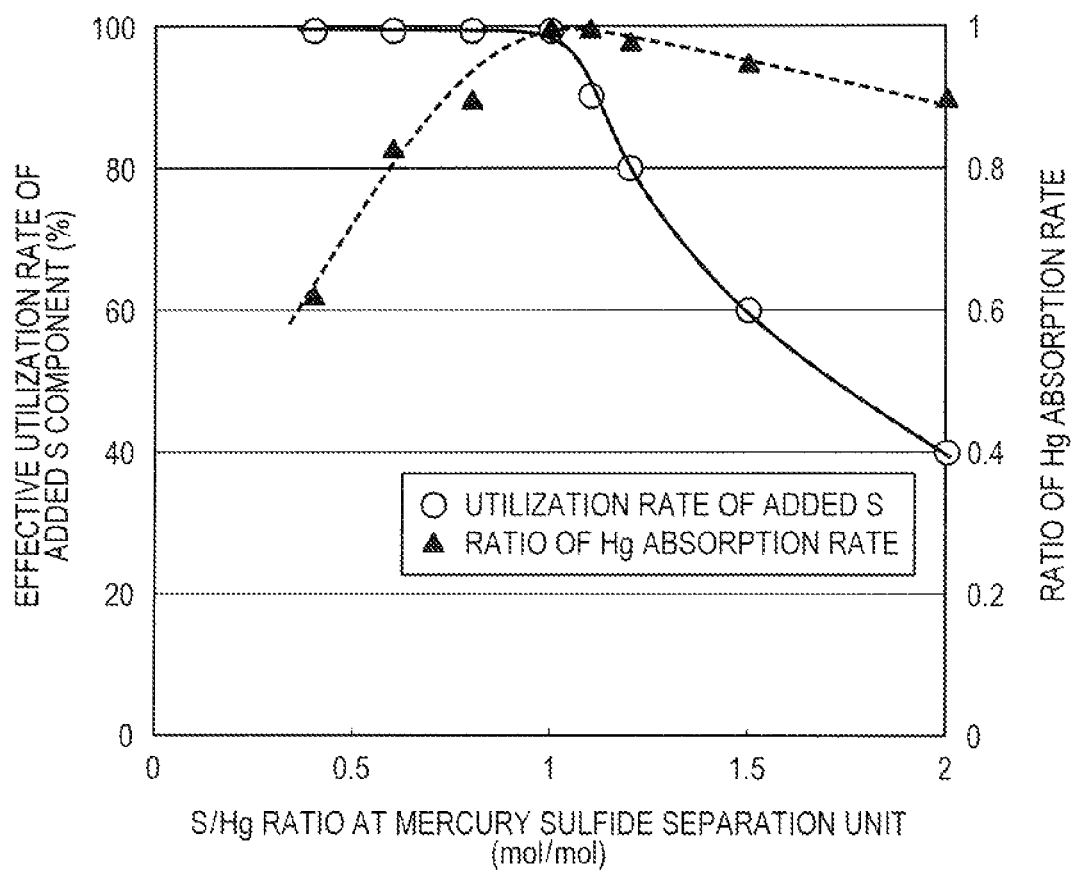
FIG. 5 illustrates results of Example 4.

A gas containing zero-valent mercury was treated under the same conditions as in Example 2 except that the iodine ion concentration was set to 1% by weight in Example 2, and the amount of the potassium sulfide added at the mercury sulfide generation unit 41 was changed, the treated gas was emitted from the mercury oxidation unit 11, and solid mercury sulfide was recovered from the mercury sulfide separation unit 51. The relation between the molar ratio of the amount of S in the potassium sulfide added at the mercury sulfide generation unit 41 to the amount of Hg contained in the mercury sulfide recovered at the mercury sulfide separation unit 51 (referred to as "S/Hg ratio at mercury sulfide separation unit" in FIG. 5) and the effective utilization rate of the added potassium sulfide (referred to as "effective utilization rate of added S component" in FIG. 5) is illustrated in FIG. 5. In addition, the relation between the molar ratio (S/Hg ratio) of the amount of S in the potassium sulfide added at the mercury sulfide generation unit 41 to the amount of Hg contained in the mercury sulfide recovered at the mercury sulfide separation unit 51 and the ratio of the zero-valent mercury absorption rate at the mercury oxidation unit 11 when the molar ratio of S/Hg (S/Hg ratio) was changed to that zero-valent mercury absorption rate at the mercury oxidation unit 11 when operated by controlling the molar ratio S/Hg to 1.0 which is taken as a standard (1.0) is also illustrated in FIG. 5.

Incidentally, the effective utilization rate of the potassium sulfide added was determined by multiplying by 100 a value obtained by dividing the amount of S contained in the mercury sulfide recovered at the mercury sulfide separation unit 51 by the amount of S in the potassium sulfide added at mercury sulfide generation unit 41.

In addition, the zero-valent mercury absorption rate is derived as a value obtained by multiplying by GHSV (amount of treated exhaust gas÷amount of catalyst) a difference between the amount of the zero-valent mercury in the exhaust gas entering the mercury oxidation unit 11 per unit time and the amount of the zero-valent mercury discharged from the mercury oxidation unit 11 per unit time likewise and dividing this product by the amount of a circulation liquid of the second circulation unit of the mercury oxidation unit 11 and indicated as the ratio based on that rate when the molar ratio (S/Hg ratio) of the amount of S in the potassium sulfide added at the mercury sulfide generation unit 41 to the amount of Hg contained in the mercury sulfide recovered at the mercury sulfide separation unit 51 is 1.0 which is taken as a standard (ratio of zero-valent mercury absorption rate) as described above.

It was found from FIG. 5 that if the amount of sulfur contained in the alkali metal sulfide added at the mercury sulfide generation unit 41 exceeds 1.2 in terms of the S/Hg ratio, the effective utilization rate of the added S component is less than 80%, which is uneconomical. On the other hand, it was confirmed that the zero-valent mercury absorption rate is 80% or more of the rate at the S/Hg ratio of 1.0 when the amount of sulfur contained in the alkali metal sulfide added at the mercury sulfide generation unit 41 is S/Hg ratio=0.6 or more to gradually decrease with its peak being near the S/Hg ratio of 1.0.

Regarding the amount of sulfur contained in the alkali metal sulfide added at the mercury sulfide generation unit 41, a range in which the value obtained by multiplying together the effective utilization rate of this added S component and the ratio of Hg absorption rate is about 80% or more is considered to be economically advantageous. Accordingly, it was found that the mercury sulfide generation unit 41 is favorably controlled such that the S/Hg ratio be about 0.6 to 1.2.

This application claims the benefit of Japanese Patent Application No. 2014-104888, filed on May 21, 2014, which is hereby incorporated by reference herein in its entirety.

REFERENCE SIGNS LIST 10, 70 Mercury separation systems
11 Mercury oxidation unit
12 Mercury separation unit
13 First circulation unit
21 Mercury oxidation portion
22 Liquid tank portion
23, 73 Sprayers
31 pH adjusting unit
32 pH meter
33 Alkali metal hydroxide storage container
34, 44, 61, 72 Pumps
41 Mercury sulfide generation unit
42 Oxidation-reduction potential measuring unit
43 Alkali metal sulfide storage container
51 Mercury sulfide separation unit
71 Iodine gas recovery unit

The invention claimed is:

1. A treatment process of a gas containing zero-valent mercury, comprising
a mercury oxidation step of oxidizing the zero-valent mercury contained in the gas containing the zero-valent mercury with a first liquid phase containing an alkali metal iodide to take the zero-valent mercury into the first liquid phase, thereby obtaining a second liquid phase containing a divalent mercury ion and an iodide ion;
a mercury separation step of separating the divalent mercury ion as mercury sulfide by adjusting the pH of the second liquid phase obtained in the mercury oxidation step with a pH adjustor and adding an alkali metal sulfide; and
a first circulation step of circulating a third liquid phase which is obtained by separating the mercury sulfide in the mercury separation step and contains an alkali metal ion and the iodide ion to use the third liquid phase as the first liquid phase in the mercury oxidation step.

2. The treatment process according to claim 1, wherein the alkali metal of the alkali metal iodide used in the mercury oxidation step is the same alkali metal as the alkali metal of the alkali metal sulfide used in the mercury separation step.

3. The treatment process according to claim 1, wherein in the mercury oxidation step, the gas containing the zero-valent mercury is brought into contact with the first liquid phase on a mercury adsorbing and oxidizing material composed of a carbon-based material.

4. The treatment process according to claim 3, wherein the carbon-based material is subjected to a water-repellent treatment.

5. The treatment process according to claim 1, wherein the gas containing the zero-valent mercury contains sulfur oxide.

6. The treatment process according to claim 1, wherein the gas containing the zero-valent mercury contains oxygen.

7. The treatment process according to claim 1, wherein the mercury oxidation step has a second circulation step of collecting the second liquid phase and circulating the collected second liquid phase to use the second liquid phase as the first liquid phase.

8. The treatment process according to claim 1, wherein the alkali metal iodide is at least one selected from potassium iodide, lithium iodide and sodium iodide, and the iodine ion concentration in the first liquid phase is 0.01 to 10% by weight.

9. The treatment process according to claim 1, wherein in the mercury separation step, the pH adjustor is at least one selected from lithium hydroxide, sodium hydroxide, potassium hydroxide, lithium hydrogencarbonate, sodium hydrogencarbonate, potassium hydrogencarbonate, lithium carbonate, sodium carbonate and potassium carbonate, and the pH of the second liquid phase is adjusted to 1.7 to 7.

10. The treatment process according to claim 1, wherein in the mercury separation step, the alkali metal sulfide is at least one selected from lithium sulfide, sodium sulfide and potassium sulfide, and the amount of sulfur contained in the alkali metal sulfide is 0.6 to 1.2 times in terms of molar ratio with respect to the divalent mercury contained in the second liquid phase to which the alkali metal sulfide is added.

11. The treatment process according to claim 1, wherein in the mercury separation step, the addition of the alkali metal sulfide is controlled on the basis of the oxidation-reduction potential of the second liquid phase to Which the alkali metal sulfide is added.

12. The treatment process according to claim 1, which has an iodine gas, recovery step of bringing an alkali metal hydroxide into contact with an iodine gas generated in the mercury oxidation step to absorb the iodine gas.

13. The treatment process according to claim 12, wherein a solution in which the iodine gas obtained in the iodine gas recovery step is absorbed is circulated to the mercury separation step.

14. A mercury separation system comprising:
a mercury oxidation unit into which a gas containing zero-valent mercury is introduced and which is configured to oxidize the zero-valent mercury with a first liquid phase containing an alkali metal iodide to take the zero-valent mercury into the first liquid phase, thereby obtaining a second liquid phase containing a divalent mercury ion and an iodide ion;
a mercury separation unit configured to separate the divalent mercury ion as mercury sulfide by adjusting the pH of the second liquid phase discharged from the mercury oxidation unit with a pH adjustor and adding an alkali metal sulfide; and
a first circulation unit configured to circulate a third liquid phase which is obtained by separating the mercury sulfide in the mercury separation unit and contains an alkali metal ion and the iodide ion to use the third liquid phase as the first liquid phase in the mercury oxidation unit.

15. The mercury separation system according to claim 14, wherein the mercury oxidation unit has a mercury oxidation portion configured to oxidize the zero-valent mercury with the first liquid phase to take it into the first liquid phase and a liquid tank portion which communicates with the mercury oxidation portion and is configured to store the second liquid phase, and also has
a second circulation unit configured to circulate the second liquid phase stored in the liquid tank portion to the mercury oxidation portion to use the second liquid phase as the first liquid phase.

16. The mercury separation system according to claim 15, wherein the iodine ion concentration in the liquid tank portion is 0.01 to 10% by weight.

17. The mercury separation system according to claim 15, which has an alkali metal iodide addition unit configured to add an alkali metal iodide into the liquid tank portion.

18. The mercury separation system according to claim 14, wherein the mercury separation unit has an oxidation-reduction potential measuring unit configured to measure the oxidation-reduction potential of the second liquid phase to which the alkali metal sulfide is added, and an addition controlling unit configured to control the addition of the alkali metal sulfide on the basis of the oxidation-reduction potential measured by the oxidation-reduction potential measuring unit.

19. The mercury separation system according to claim 14, which has an iodine gas recovery unit configured to bring an alkali metal hydroxide into contact with an iodine gas generated in the mercury oxidation unit to absorb the iodine gas.

20. The mercury separation system according to claim 19, which has a third circulation unit configured to circulate a solution in which the iodine gas emitted from the iodine gas recovery unit is absorbed to the mercury sulfide separation unit.

21. A mercury separation system comprising:
a mercury oxidation device having a mercury oxidation portion filled with a mercury adsorbing and oxidizing material composed of a carbon-based material, a gas introduction unit configured to introduce a gas containing zero-valent mercury into the mercury oxidation portion to circulate it, an alkali metal iodide supplying unit configured to introduce a liquid containing an alkali metal iodide into the mercury oxidation portion to cause the liquid to flow down along a surface of the mercury adsorbing and oxidizing material and a liquid tank portion configured to store the liquid having flowed down;
a mercury separation device having a pH adjusting unit configured to add a pH adjustor to the liquid taken out of the liquid tank portion, a mercury sulfide generation unit configured to add an alkali metal sulfide to the liquid taken out to generate mercury sulfide and a mercury sulfide separation unit configured to separate the mercury sulfide generated in the liquid whose pH is adjusted and to which the alkali metal sulfide is added; and
a first circulation unit configured to circulate the liquid from which the mercury sulfide is separated and removed in the mercury sulfide separation unit of the mercury separation device to the mercury oxidation device.

* * * * *